B. MORSE.
Seed-Sowers.

No. 145,520.  Patented Dec. 16, 1873.

Witnesses:
S. J. Parker.
A. M. Smith.

Ben Morse
Inventor.

AM. PHOTO-LITHOGRAPHIC Co. N.Y. (OSBORNE'S PROCESS)

UNITED STATES PATENT OFFICE.

BEN MORSE, OF ITHACA, NEW YORK.

IMPROVEMENT IN SEED-SOWERS.

Specification forming part of Letters Patent No. 145,520, dated December 16, 1873; application filed April 21, 1873.

CASE B.

*To all whom it may concern:*

Be it known that I, BEN MORSE, of Ithaca, Tompkins county, New York, have invented an Improvement in Sowers and Seeders, and an adjustable wheel connected with the said sower, and used also in a rake invented by the said Morse as aforesaid, of which the following is a specification:

My object is to make a simple and effective sower and seeder, and to combine it with the same wheels, axle, and other parts which I use for my rake as patented to me August 19, 1873; and my invention relates, first, to the seeding or sowing device; second, to the cam-wheel which operates both the sower and the rake.

Figure 1:
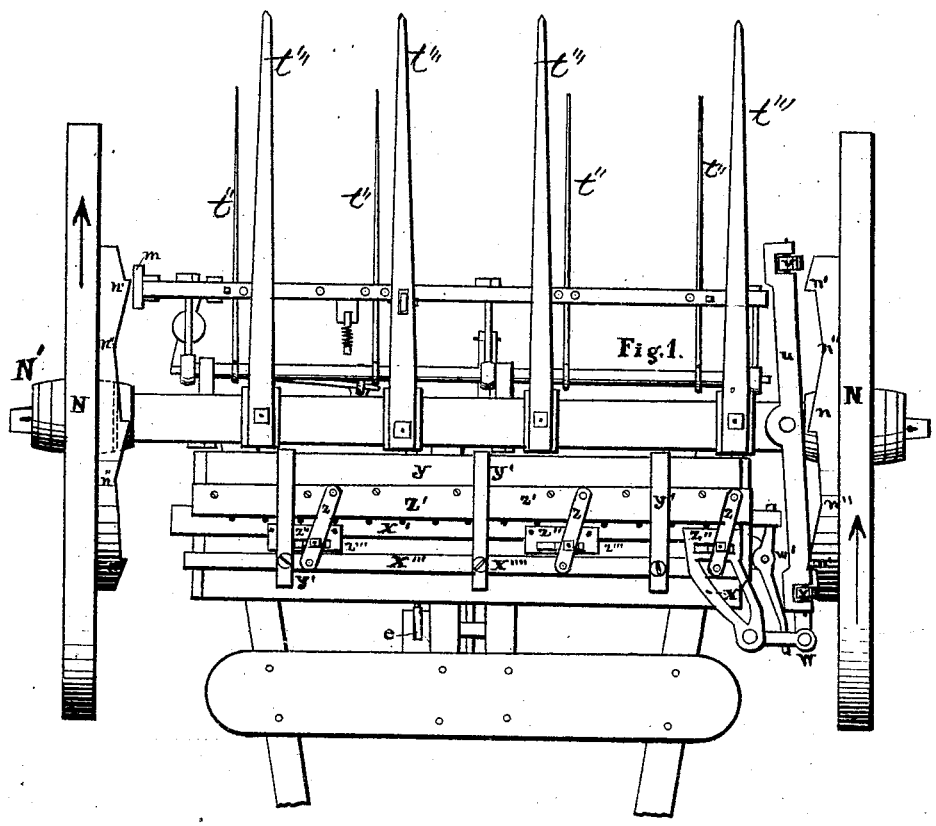
Figure 3:
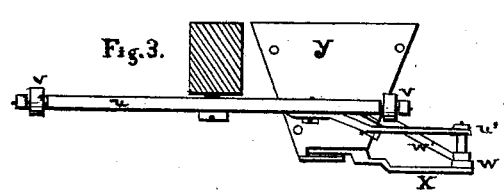
Figure 5:
Figure 2:
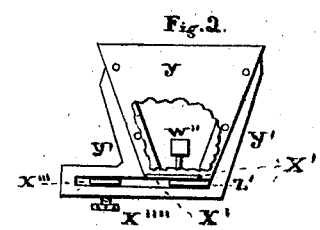
Figure 4:
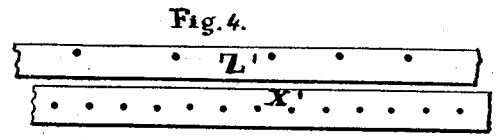

Figure 1 is an inverted plan view of my combined rake and sower, but especially designed to show what will be claimed. Fig. 2 is an end view of the sowing-box. Fig. 3 is a view of the sowing-box, more clearly showing portions of its arrangements. Fig. 4 is a detached view of the sowing-bars; and Fig. 5, a view of the slot-pin, enlarged.

In Fig. 1 the sower-box $y$ is seen secured beneath the thills, which make part of the frame, fast to the axle-tree.

I shall first describe the wheel N, which, with its attached cam-wheel $n$, is one of two wheels which support the sowing-box, and also the rake, and next the sowing device itself. First, to the wheel N a cam-wheel, $n$, is attached, with the inclines or depressions $n''$ and the perpendicular or other shaped catches or teeth $n'$, made substantially as represented. The action of this combined wheel N $n$ is as follows: When it is put on one end of the axle-tree, as at N', it turns in the direction indicated, and presents the perpendicular faces of the cams, at the will of the operator, to an adjustable catch-bar upon the rake-frame, by which means the rake is raised (wholly or in part by the force of the revolving wheel) at the desired moment to "dump" or discharge the hay.

It will be seen, by a moment's reflection, that rarely is the rake and the sower used at the same time, and that the main object of this arrangement is to save the expense of separate wheels, frame, and other parts for the rake and the sower, as well as storage room under cover, which all farm implements, when cared for, properly require; and hence both wheels are not usually made, as represented, with cams attached, one wheel being plain. But when the rake-teeth are made sufficiently strong to harrow, as they may be, then the sower and the rake (now the harrow) are used at the same time, the dumping mechanism now being useful to relieve the harrow-teeth or avoid obstacles. But when the wheel N $n$ is changed or put on the other end of the axle-tree, the direction of the revolution of the cam-wheel $n$ is reversed, and the rollers $v$ of the swing-bar $u$, which is pivoted on the axle-tree, roll over the toothed part of the cam-wheel $n$ without catching, and fall into the hollows or undulations $n''$ of the said wheel $n$, for the purpose of giving motion to the seed-slides of the sower.

The motion described above is communicated to the slide as follows: Upon the swing-bar $u$ is another hinge, in which is pivoted one end of the rod W, the other end being hinged or pivoted to the plate X, which plate is fast to the slide X'. Thus the oscillations of the swing-bar move directly this slide X', and, by means described hereafter, move also the slide W''. The slide W'' is held in immovable holders or clamps, and is, hence, not adjustable. The slide X' is adjustable, and may be called, also, the seeding or escape slide; and it has holes in it for seeding or the escape of the article sown. This escape-slide X' fits closely on a plate, Z', which is fast and immovable, being secured to the back of the feed-box, and when the escape-slide is adjusted to the plate Z' the degree of opening the holes is determined. This adjustment is made by the slotted plates Z'', set-screws X'''', and parallel connecting bars or rods Z, as is apparent in the drawings. It is desirable that the slide W'' inside of the sowing-box move in an opposite direction to that of the lower slide X', and this is effected by a hinged or pivoted lever, W', one end of which is moved by the sowing swing-bar $u$, either by a direct or short connection, as may be most desirable, and the other end connects with the internal slide W″, a pivot or lever hinge being between the two ends, which changes the direction of the motion, and thus the slide X′ moves one way and the internal slide or agitator W″ moves the other, at the same time. For the sake of distinctness, it will be noticed that the rake-strippers are marked t″ and the rake-teeth t‴.

The advantages and uses of my invention are apparent to those skilled in the art to which it appertains.

I claim—

1. The slides X′, X‴, and W″, and plate Z′, in combination with the bar u, lever W′, and frame-piece X, combined and operated substantially as set forth.

2. In combination with the reversible wheel N, the wheel n, attached thereto, having cams formed with catches and undulations, as described, to operate a horse-rake wholly or in part when on one end of the axle-tree, and a sowing device when on the other end, substantially as set forth.

BEN MORSE.

Witnesses:
S. J. PARKER,
A. M. LUCAS.